United States Patent
Yoshida et al.

(10) Patent No.: US 6,572,683 B2
(45) Date of Patent: Jun. 3, 2003

(54) SUBSTANCE SEPARATION STRUCTURE AND METHOD OF PREPARING THE SAME

(75) Inventors: Kentaro Yoshida, Itami (JP); Takeshi Hikata, Itami (JP); Nobuyuki Okuda, Itami (JP); Takashi Uemura, Itami (JP)

(73) Assignee: Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 09/991,349

(22) Filed: Nov. 20, 2001

(65) Prior Publication Data
US 2002/0062738 A1 May 30, 2002

(30) Foreign Application Priority Data

Nov. 24, 2000 (JP) ........................... 2000-357405
Oct. 12, 2001 (JP) ........................... 2001-314754

(51) Int. Cl.⁷ ........................... B01D 53/22; B01D 71/02
(52) U.S. Cl. ........................... 96/11; 95/56; 55/524; 55/DIG. 5
(58) Field of Search ............... 95/45, 55, 56; 96/4.11; 55/524, DIG. 5

(56) References Cited

U.S. PATENT DOCUMENTS

| | | | |
|---|---|---|---|
| 2,958,391 A | * 11/1960 | DeRosset | |
| 3,022,187 A | * 2/1962 | Eyraud et al. | |
| 3,241,298 A | * 3/1966 | Pierce | |
| 3,413,777 A | * 12/1968 | Langley et al. | |
| 3,428,476 A | * 2/1969 | Langley et al. | |
| 3,505,180 A | 4/1970 | Brogden | |
| 3,717,525 A | * 2/1973 | Bultemann | |
| 4,451,525 A | 5/1984 | Kawazoe et al. | |
| 4,689,150 A | * 8/1987 | Abe et al. | 210/490 |
| 4,865,630 A | * 9/1989 | Abe | 96/11 |
| 4,971,696 A | * 11/1990 | Abe et al. | 210/500.25 |
| 5,240,480 A | * 8/1993 | Thorogood et al. | 96/4 |
| 5,487,774 A | * 1/1996 | Peterson et al. | 95/45 |
| 5,498,278 A | * 3/1996 | Edlund | 96/11 |
| 5,614,001 A | * 3/1997 | Kosaka et al. | 96/10 |
| 5,723,035 A | * 3/1998 | Mazanec et al. | 204/295 |
| 5,738,708 A | * 4/1998 | Peachey et al. | 95/56 |
| 5,989,319 A | * 11/1999 | Kawae et al. | 96/11 |
| 6,066,592 A | * 5/2000 | Kawae et al. | 502/439 |
| 6,074,457 A | * 6/2000 | Anthonis et al. | 95/45 |
| 6,086,729 A | 7/2000 | Bredesen et al. | |
| 6,143,159 A | * 11/2000 | Bloomfield et al. | 205/265 |
| 6,152,987 A | * 11/2000 | Ma et al. | 95/56 |
| 6,315,820 B1 | * 11/2001 | Saloka et al. | 96/11 |

FOREIGN PATENT DOCUMENTS

| | | |
|---|---|---|
| JP | 05085702 | 4/1993 |
| JP | 08071385 | 3/1996 |
| JP | 11267477 | 10/1999 |
| JP | 2000237561 | 9/2000 |
| WO | WO 00/32512 | 6/2000 |

* cited by examiner

Primary Examiner—Robert H. Spitzer
(74) Attorney, Agent, or Firm—W. F. Fasse; W. G. Fasse

(57) ABSTRACT

A substance separation structure comprises a base material including a porous material having a continuous hole with an opening of the hole formed on at least one surface, a porous layer, formed to fill up the opening, having a hole smaller than the hole of the base material and a permeable membrane of not more than 1 $\mu$m in thickness formed on at least one surface of the base material formed with the porous layer to selectively permeate ions or neutral elements or molecules, and the surface roughness of at least one surface of the base material formed with the porous layer is not more than 0.3 $\mu$m in Rmax. The surface of the base material is polished with abrasive grains containing a porous material so that the opening of the base material can be filled up with the porous layer, and the permeable membrane is formed by ion plating.

15 Claims, 1 Drawing Sheet

SUBSTANCE SEPARATION STRUCTURE AND METHOD OF PREPARING THE SAME

BACKGROUND OF THE INVENTION

1. Field of the Invention

The present invention generally relates to a substance separation structure and a method of preparing the same, and more specifically, it relates to a substance separation structure provided with a permeable membrane formed on a porous base material having continuous holes and a method of preparing the same.

2. Description of the Prior Art

A gas permeation membrane is put into practice in the field of oxygen enrichment, nitrogen enrichment, carbon dioxide separation, hydrogen separation and the like. An oxygen enrichment membrane or a nitrogen enrichment membrane concentrating oxygen or nitrogen contained in the air is employed for combustion or medical application. A carbon dioxide separation membrane separating methane and carbon dioxide contained in natural gas from each other is employed for recovering carbon dioxide. A hydrogen separation membrane is used for separating and recovering gaseous hydrogen employed for desulfurizing petroleum.

Gaseous hydrogen, employed as the fuel for a fuel cell or the like, is industrially prepared by denaturation of gaseous fuel or the like. According to the denaturation of gaseous fuel, for example, gaseous hydrogen is prepared by reforming steam, while the reformed gas contains carbon monoxide, carbon dioxide and the like as subcomponents in addition to the main component of hydrogen. When the reformed gas is applied to the fuel for a fuel cell as such, for example, the performance of the cell is deteriorated. Therefore, the reformed gas must be purified for removing the subcomponents other than hydrogen and obtaining high-purity gaseous hydrogen. The reformed gas may be purified by a method utilizing the characteristic of a hydrogen-permeable membrane selectively permeating only hydrogen.

Japanese Patent Laying-Open No. 11-267477 (1999) proposes a method of forming a hydrogen-permeable metal film such as a Pd film or an Nb film of about 0.1 to 20 $\mu$m in thickness on a surface of a porous support of stainless steel or ceramics such as alumina or silicon nitride by ion plating, in order to prepare a hydrogen-permeable membrane having no pinholes.

The hydrogen permeability of such a hydrogen-permeable membrane is in inverse proportion to the thickness thereof, and hence the thickness of the hydrogen-permeable membrane must be reduced to the utmost in order to improve the hydrogen permeability. When a hydrogen-permeable membrane of not more than 1 $\mu$m in thickness is formed on a surface of a porous base material by ion plating, however, it is impossible to form a dense membrane having no pinholes. Therefore, a hydrogen-permeable membrane sufficiently improved in hydrogen permeability cannot be prepared.

SUMMARY OF THE INVENTION

An object of the present invention is to provide a substance separation structure capable of forming a hydrogen-permeable membrane of not more than 1 $\mu$m in thickness on a surface of a porous base material as a dense membrane having no pinholes with high hydrogen permeability and durability, and a method of preparing the same.

The inventor has made various studies on membrane forming methods, to find out that a dense membrane having no pinholes can be prepared by polishing a surface of a porous base material with abrasive grains containing a porous material and thereafter forming a permeable membrane.

On the basis of this recognition, a substance separation structure according to an aspect of the present invention comprises a base material including a porous material having a continuous hole with an opening of the hole formed on at least one surface, a porous layer, formed to fill up the opening formed on at least one surface of the base material, having a hole smaller than the hole of the base material, and a permeable membrane of not more than 1 $\mu$m in thickness formed on at least one surface of the base material formed with the porous layer to selectively permeate ions or neutral elements or molecules, while the surface roughness of at least one surface of the base material formed with the porous layer is not more than 0.3 $\mu$m in Rmax.

In the substance separation structure according to the present invention, the surface of the base material is flattened to the surface roughness of not more than 0.3 $\mu$m in Rmax while the opening of the hole formed on the surface of the base material is filled up with the porous layer, whereby the permeable membrane of not more than 1 $\mu$m in thickness can be formed on the surface of the base material in a dense state with no pinholes. Thus, permeability of the permeable membrane can be improved.

In the substance separation structure according to the present invention, the ratio (Tb/Ta) of the mean thickness Tb of a portion of the porous layer formed on the surface of the base material outside the hole of the base material to the mean thickness Ta of a portion of the porous layer formed in the hole of the base material is set to at least 0 and not more than 1, thereby improving adhesion between the permeable membrane and the surface of the base material. Thus, durability of the substance separation structure can be improved.

Preferably, the porous material forming the base material is at least one material selected from a group consisting of ceramics, a metal and a complex of the ceramics and the metal.

More preferably, the porous material forming the base material is porous silicon nitride having porosity of at least 30% and not more than 70%.

Further preferably, the porous material forming the base material includes at least one material selected from a group consisting of iron and nickel, and has porosity of at least 60% and not more than 95%.

In the substance separation structure according to the present invention, the permeable membrane may not be porous. Preferably, the permeable membrane is made of a metal, an alloy or a compound containing at least one material selected from a group consisting of palladium (Pd), platinum (Pt), gold (Au), silver (Ag), niobium (Nb), tantalum (Ta), vanadium (V) and zirconium (Zr). More preferably, the permeable membrane is formed by a single layer or a plurality of layers. Further preferably, the permeable membrane is made of a compound having a zeolite structure or a perovskite structure.

Preferably, the surface roughness of at least one surface of the base material not yet formed with the porous layer is not more than 0.3 μm in Rmax. More preferably, the surface roughness of at least one surface of the base material formed with the porous layer and the permeable membrane is not more than 0.3 μm in Rmax.

A method of preparing a substance separation structure according to another aspect of the present invention comprises steps of polishing a surface of a base material including a porous material having a continuous hole with an opening of the hole formed on at least one surface with abrasive grains containing a porous material to be capable of filling up the opening with a porous layer and forming a permeable membrane of not more than 1 μm in thickness by plating or ion plating on the surface of the base material formed with the porous layer by the polishing.

Preferably in the method according to the present invention, the porous material forming the base material is at least one material selected from a group consisting of ceramics, a metal and a complex of the ceramics and the metal.

Preferably, the abrasive grains containing the porous material contain at least one material selected from a group consisting of porous aluminum oxide and titanium oxide. More preferably, the average diameter of the abrasive grains containing the porous material is smaller than the average diameter of the opening formed on at least one surface of the base material.

In the method according to the present invention, arc ion plating is preferably employed as the ion plating.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
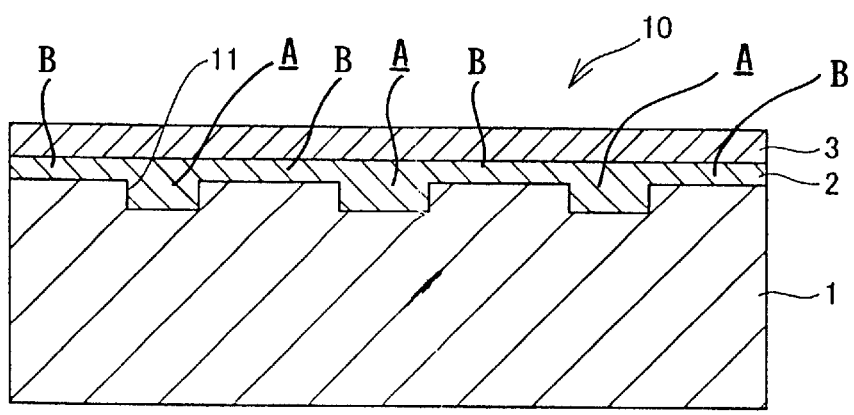
FIG. 1 is a schematic sectional view showing a substance separation structure according to an embodiment of the present invention.

As shown in FIG. 1, a substance separation structure 10 according to the present invention comprises a base material 1, a porous layer 2 formed to fill up openings 11 provided on at least one surface of the base material 1 and a permeable membrane 3 of not more than 1 μm in thickness provided on at least the surface of the base material 1 formed with the porous layer 2. The base material 1 consists of a porous material having a number of continuous holes (not shown) communicating with the openings 11, and the porous layer 2 has holes (not shown) smaller than those of the base material 1. The permeable membrane 3 is formed to selectively permeate ions or neutral elements or molecules. The surface roughness of at least the surface of the base material 1 formed with the porous layer 2 is not more than 0.3 μm in Rmax.

In an embodiment of the substance separation structure according to the present invention, a permeable membrane of not more than 1 μm in thickness is formed on a surface of a porous silicon nitride base material flattened to have surface roughness of not more than 0.3 μm in Rmax by polishing with abrasive grains containing a porous material. The abrasive grains containing a porous material are preferably prepared from those containing grains of γ-aluminum oxide ($\gamma$-$Al_2O_3$) grains. It is preferable to employ aluminum oxide abrasive grains having an average diameter smaller than the average diameter of openings of holes formed on the surface of the silicon nitride base material. The material for the permeable membrane can be prepared from any of metals such as palladium, platinum, gold, silver, vanadium, niobium, tantalum and zirconium or an alloy or a compound containing any of these metals.

On the flattened surface of the silicon nitride base material, the porous aluminum oxide layer is formed on the portions of the holes. The porous aluminum oxide layer consists of portions A formed in the holes of the silicon nitride base material and portions B formed on the surface of the silicon nitride base material outside the holes, and the ratio (Tb/Ta) of the mean thickness Tb of the portions B to the mean thickness Ta of the portions A is at least 0 and not more than 1. High adhesion is attained between the permeable membrane formed on the surface of the base material and the base material. Therefore, the permeable membrane is not separated from the base material but maintains a dense state with no pinholes when purifying hydrogen-containing gas. Thus, gas other than hydrogen can be remarkably inhibited from passing through the permeable membrane, and high-purity gaseous hydrogen can be obtained.

The permeable membrane is formed on the surface of the porous base material by plating or ion plating. While ion plating includes various types of methods and any method is applicable to the present invention, arc ion plating (arc discharge ion plating) is particularly preferably employed.

While a palladium film, for example, has excellent hydrogen permeability for serving as the permeable membrane, (100) planes of palladium crystals exhibit lower hydrogen permeability than the remaining crystal planes. When a palladium film is so formed as to orient palladium crystals on (111) planes, superior hydrogen permeability can be attained as compared with a palladium film having no such orientation. According to the inventive method, a palladium film is formed on a surface, flattened by polishing with abrasive grains containing a porous material, of a porous base material having continuous holes by arc ion plating with application of a bias voltage so that palladium crystals are oriented in (111) planes, whereby excellent hydrogen permeability can be attained.

Porous silicon nitride employed for the base material of the inventive substance separation structure preferably has network hole portions formed by columnar $\beta$-$Si_3N_4$ crystal grains intertwined with each other. The porosity of the porous silicon nitride is preferably within the range of 30 to 70%, particularly preferably within the range of 40 to 50%. Further, the bending strength of the porous silicon nitride base material is preferably within the range of 30 to 450 MPa, and particularly preferably within the range of 200 to 450 MPa.

The hydrogen permeability of the permeable membrane is in inverse proportion to the thickness thereof such that the hydrogen flux through a membrane having a thickness of 1 μm is 10 times that of a membrane having a thickness of 10 μm, for example. When the hydrogen flux is increased to 10 times, the surface area of the membrane necessary for attaining the same hydrogen flux is reduced to 1/10. When the thickness of the permeable membrane is reduced to 1/10, therefore, the necessary weight of the membrane is reduced to 1/100. According to the present invention, therefore, a dense permeable membrane having excellent hydrogen permeability can be formed with a thickness of not more than 1 μm, whereby a compact substance separation structure having high performance can be prepared at a low cost.

When the surface of the porous base material is polished with nonporous diamond grains, the hole portions of the porous base material remain as cavities on the surface and hence the surface roughness exceeds 1 μm in Rmax. Consequently, the permeable film of not more than 1 μm in thickness cannot be formed on the surface of the base material in a state with no pinholes.

When the porous layer is formed on the surface of the porous base material having continuous holes by a sol-gel method or the like, the mean thickness Ta of the portions A of the porous layer formed in the holes of the base material is reduced below the mean thickness Tb of the portions B of the porous layer formed on the surface of the base material outside the holes. In other words, the ratio (Tb/Ta) of the mean thickness Tb of the portions B to the mean thickness Ta of the portions A exceeds 1. When the permeable membrane is formed on the surface of the base material treated in this manner, adhesion between the permeable membrane and the base material is reduced. Therefore, the permeable membrane is separated from the base material when purifying hydrogen-containing gas.

EXAMPLE 1

A porous silicon nitride sintered body having surface roughness of about 2.0 μm in Rmax was prepared as the base material for a substance separation structure. A surface of the aforementioned porous silicon nitride sintered body was polished with aluminum oxide abrasive grains of 0.05 μm in mean grain size, to be flattened. The mean pore diameter of the porous silicon nitride sintered body was 0.3 μm. The aluminum oxide abrasive grains contained 15 mass % of α-aluminum oxide grains and 85 mass % of γ-aluminum oxide grains. The polished porous silicon nitride base material exhibited surface roughness of 0.3 μm in Rmax. The surface roughness was measured with a tracer type surface roughness tester (measurement resolution: 0.01 μm) provided with a tracer having a radius R of 100 μm on the forward end. The ratio (Tb/Ta) of the mean thickness Tb of the portions B of the aluminum oxide layer formed on the surface of the silicon nitride base material outside the holes of the silicon nitride base material to the mean thickness Ta of the portions A formed in the holes of the silicon nitride base material was 0.1.

An arc ion plating apparatus was used for forming a permeable membrane on the surface of the porous silicon nitride base material treated in the aforementioned manner. Palladium was set on a target in a chamber of the arc ion plating apparatus as the material for the permeable membrane, at a distance of 300 mm from the base material. The pressure in the chamber of the arc ion plating apparatus was set to $2.66 \times 10^{-3}$ Pa ($2 \times 10^{-5}$ Torr), and the arc ion plating apparatus was driven with a bias voltage of −400 V and an arc current of 80 A. Thus, a palladium film of 1.0 μm in thickness was formed on the surface of the base material.

No pinholes were observed on the surface of the obtained palladium film. In this film, palladium crystals were oriented and grown on (111) planes.

The substance separation structure prepared in the aforementioned manner was employed for purifying hydrogen-containing gas at a temperature of 500° C. In this case, the palladium film was not separated from the base material but maintained a dense state with no pinholes. Thus, it was possible to remarkably suppress gas other than hydrogen from passing through the hydrogen-permeable membrane for obtaining high-purity gaseous hydrogen.

EXAMPLE 2

In order to form a permeable membrane on a surface of a porous silicon nitride base material flattened similarly to Example 1, an arc ion plating apparatus was driven for 10 minutes under the same conditions as Example 1, except that the bias voltage was set to −1000 V. Thus, a palladium film of 0.3 μm in thickness was formed on the surface of the base material.

No pinholes were observed in the surface of the obtained palladium film. In this film, palladium crystals were oriented and grown on (111) planes.

The substance separation structure prepared in the aforementioned manner was employed for purifying hydrogen-containing gas at a temperature of 500° C. In this case, the palladium film was not separated from the base material but maintained a dense state with no pinholes. Thus, it was possible to remarkably suppress gas other than hydrogen from passing through the permeable membrane for obtaining high-purity gaseous hydrogen.

EXAMPLE 3

In order to form a permeable membrane on a surface of a porous silicon nitride base material flattened similarly to Example 1, an arc ion plating apparatus was driven for 10 minutes under the same conditions as Example 1, except that a palladium-silver (Pd—Ag) alloy containing 75 mass % of Pd and 25 mass % of Ag was set on the target as the material for the permeable membrane. Thus, a palladium-silver alloy film of 1.0 μm in thickness was formed on the surface of the base material.

No pinholes were observed in the surface of the obtained palladiumsilver alloy film. In this film, crystals of the palladium-silver alloy were oriented and grown on (111) planes.

The substance separation structure prepared in the aforementioned manner was employed for purifying hydrogen-containing gas at a temperature of 500° C. In this case, the palladium-silver alloy film was not separated from the base material but maintained a dense state with no pinholes. Thus, it was possible to remarkably suppress gas other than hydrogen from passing through the permeable membrane for obtaining high-purity gaseous hydrogen.

EXAMPLE 4

A porous silicon nitride sintered body having surface roughness of about 2.0 μm in Rmax was prepared as the base material for a substance separation structure. A surface of the aforementioned porous silicon nitride sintered body was polished with aluminum oxide abrasive grains of 0.05 μm in mean grain size, to be flattened. The mean pore diameter of the porous silicon nitride sintered body was 0.3 μm. The aluminum oxide abrasive grains contained 15 mass % of α-aluminum oxide grains and 85 mass % of γ-aluminum oxide grains. The polished porous silicon nitride base material exhibited surface roughness of 0.3 μm in Rmax. The surface roughness was measured with a tracer type surface roughness tester (measurement resolution: 0.01 μm) provided with a tracer having a radius R of 100 μm on the forward end. The ratio (Tb/Ta) of the mean thickness Tb of the portions B of the aluminum oxide layer formed on the surface of the silicon nitride base material outside the holes of the silicon nitride base material to the mean thickness Ta of the portions A of the aluminum oxide layer formed in the holes of the silicon nitride base material was 0.9.

In order to form a permeable membrane on the surface of the porous silicon nitride base material treated in the aforementioned manner, an arc ion plating apparatus was driven for 10 minutes under the same conditions as Example 1. Thus, a palladium film of 1.0 μm in thickness was formed on the surface of the base material.

No pinholes were observed in the surface of the obtained palladium film. In this film, palladium crystals were oriented and grown on (111) planes.

The substance separation structure prepared in the aforementioned manner was employed for purifying hydrogen-containing gas at a temperature of 500° C. In this case, the palladium film was not separated from the base material but maintained a dense state with no pinholes. Thus, it was possible to remarkably suppress gas other than hydrogen from passing through the permeable membrane for obtaining high-purity gaseous hydrogen.

COMPARATIVE EXAMPLE 1

A porous silicon nitride sintered body having surface roughness of about 2.0 μm in Rmax was prepared as the base material for a substance separation structure. A surface of the aforementioned porous silicon nitride sintered body was polished with diamond abrasive grains of 0.25 μm in mean grain size, to be flattened. The mean pore diameter of the porous silicon nitride sintered body was 0.3 μm. The surface roughness of the polished porous silicon nitride base material was 1.2 μm in Rmax.

In order to form a permeable membrane on the surface of the porous silicon nitride base material treated in the aforementioned manner, an arc ion plating apparatus was driven for 10 minutes under the same conditions as Example 2. Thus, a palladium film of 0.3 μm in thickness was formed on the surface of the base material.

Pinholes were present in the surface of the palladium film formed in the aforementioned manner. Thus, it was impossible to form a dense palladium film on the surface of the base material.

COMPARATIVE EXAMPLE 2

A porous silicon nitride sintered body having surface roughness of about 2.0 μm in Rmax was prepared as the base material for a substance separation structure. In order to form a permeable membrane on a surface of this porous silicon nitride base material, an arc ion plating apparatus was driven for 10 minutes under the same conditions as Example 2. Thus, a palladium film of 0.3 μm in thickness was formed on the surface of the base material.

Pinholes were present in the surface of the palladium film formed in the aforementioned manner. Thus, it was impossible to form a dense palladium film on the surface of the base material.

According to the present invention, as hereinabove described, a compact substance separation structure having high hydrogen permeability and durability can be prepared at a low cost.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A substance separation structure comprising:
    a base material including a porous material having a continuous hole with an opening of said hole formed on at least one surface;
    a porous layer, formed to fill up said opening formed on said at least one surface of said base material, having a hole smaller than said hole of said base material; and
    a permeable membrane of not more than 1 μm in thickness formed on said at least one surface of said base material formed with said porous layer to selectively permeate ions or neutral elements or molecules, wherein
    the surface roughness of said at least one surface of said base material formed with said porous layer is not more than 0.3 μm in Rmax.

2. The substance separation structure according to claim 1, wherein the ratio (Tb/Ta) of the mean thickness Tb of a portion of said porous layer formed on said surface of said base material outside said hole of said base material to the mean thickness Ta of a portion of said porous layer formed in said hole of said base material is at least 0 and not more than 1.

3. The substance separation structure according to claim 1, wherein said porous material forming said base material is at least one material selected from a group consisting of ceramics, a metal and a complex of said ceramics and said metal.

4. The substance separation structure according to claim 1, wherein said porous material forming said base material is porous silicon nitride having porosity of at least 30% and not more than 70%.

5. The substance separation structure according to claim 1, wherein said porous material forming said base material includes at least one material selected from a group consisting of iron and nickel, and has porosity of at least 60% and not more than 95%.

6. The substance separation structure according to claim 1, wherein said permeable membrane is made of a metal, an alloy or a compound containing at least one material selected from a group consisting of palladium, platinum, gold, silver, vanadium, niobium, tantalum and zirconium.

7. The substance separation structure according to claim 6, wherein said permeable membrane is formed by a single layer or a plurality of layers.

8. The substance separation structure according to claim 1, wherein said permeable membrane is made of a compound having a zeolite structure or a perovskite structure.

9. The substance separation structure according to claim 1, wherein the surface roughness of said at least one surface of said base material not yet formed with said porous layer is not more than 0.3 μm in Rmax.

10. The substance separation structure according to claim 1, wherein the surface roughness of said at least one surface of said base material formed with said porous layer and said permeable membrane is not more than 0.3 μm in Rmax.

11. A method of preparing a substance separation structure comprising steps of:

polishing a surface of a base material including a porous material having a continuous hole with an opening of said hole formed on at least one surface with abrasive grains containing a porous material to be capable of filling up said opening with a porous layer; and forming a permeable membrane of not more than 1 μm in thickness by plating or ion plating on said surface of said base material formed with said porous layer by said polishing.

12. The method of preparing a substance separation structure according to claim 11, wherein said porous material forming said base material is at least one material selected from a group consisting of ceramics, a metal and a complex of said ceramics and said metal.

13. The method of preparing a substance separation structure according to claim 11, wherein said abrasive grains containing said porous material contain at least one material selected from a group consisting of porous aluminum oxide and titanium oxide.

14. The method of preparing a substance separation structure according to claim 11, wherein the average diameter of said abrasive grains containing said porous material is smaller than the average diameter of said opening formed on said at least one surface of said base material.

15. The method of preparing a substance separation structure according to claim 11, wherein said ion plating is arc ion plating.

* * * * *